(12) United States Patent
Ito et al.

(10) Patent No.: US 10,549,379 B2
(45) Date of Patent: Feb. 4, 2020

(54) FRICTION STIR WELDING METHOD AND JOINED BODY

(71) Applicant: Kabushiki Kaisha Toshiba, Minato-ku (JP)

(72) Inventors: Takashi Ito, Yokohama (JP); Taizo Tomioka, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 347 days.

(21) Appl. No.: 15/401,747

(22) Filed: Jan. 9, 2017

(65) Prior Publication Data
US 2017/0225265 A1    Aug. 10, 2017

(30) Foreign Application Priority Data
Feb. 5, 2016 (JP) .................................. 2016-020744

(51) Int. Cl.
*B23K 20/12*    (2006.01)
*B23K 20/233*    (2006.01)

(52) U.S. Cl.
CPC ...... *B23K 20/1255* (2013.01); *B23K 20/1265* (2013.01); *B23K 20/2336* (2013.01)

(58) Field of Classification Search
CPC ...... B23K 2103/02–05; B23K 2103/10; B23K 2103/12; B23K 2103/14; B23K 2103/15;
(Continued)

(56) References Cited

U.S. PATENT DOCUMENTS

| | | | | |
|---|---|---|---|---|
| 4,144,110 A | * | 3/1979 | Luc | B23K 20/04 156/73.5 |
| 5,862,975 A | * | 1/1999 | Childress | B23K 31/02 228/120 |

(Continued)

FOREIGN PATENT DOCUMENTS

| | | |
|---|---|---|
| CN | 103934584 A | 7/2014 |
| CN | 104668765 A | 6/2015 |

(Continued)

OTHER PUBLICATIONS

Machine translation of JP-2007098439-A (no date available).*
(Continued)

*Primary Examiner* — Kiley S Stoner
(74) *Attorney, Agent, or Firm* — Oblon, McClelland, Maier & Neustadt, L.L.P.

(57) ABSTRACT

A friction stir welding method includes joining a first metal member, a second metal member, and a third metal member by pressing a tool onto a joining member while rotating the tool. The tool has a protrusion at a tip of the tool. The joining member includes the first metal member, the second metal member, and the third metal member. A major element of the second metal member is the same as a major element included in the first metal member. The third metal member is sandwiched between at least a portion of the first metal member and at least a portion of the second metal member. A major element of the third metal member is the same as the major element included in the first metal member and the second metal member. A crystal grain size of the third metal member is 20 μm or less.

13 Claims, 4 Drawing Sheets

(58) Field of Classification Search
CPC .... B23K 2103/166; B23K 2103/20–24; B23K 20/2336; B23K 20/122–1295
USPC ...... 228/262.5, 262.4, 262.41, 262.6, 262.71
See application file for complete search history.

(56) References Cited

U.S. PATENT DOCUMENTS

| | | | | |
|---|---|---|---|---|
| 7,861,910 B2* | 1/2011 | Okauchi | ............. | B23K 20/123 228/103 |
| 2001/0038028 A1* | 11/2001 | Iwashita | ............. | B23K 20/123 228/112.1 |
| 2002/0158109 A1* | 10/2002 | Gendoh | ............. | B23K 20/123 228/112.1 |
| 2003/0141343 A1* | 7/2003 | Murakami | ........... | B23K 20/123 228/112.1 |
| 2006/0278325 A1* | 12/2006 | Kumagai | ............. | B23K 20/122 156/73.5 |
| 2007/0029368 A1* | 2/2007 | Kubouchi | ........... | H01G 9/0029 228/112.1 |
| 2007/0187469 A1* | 8/2007 | Chen | .................... | B23K 20/122 228/112.1 |
| 2008/0067215 A1* | 3/2008 | Gendou | ............. | B23K 20/1265 228/112.1 |
| 2009/0140027 A1* | 6/2009 | Badarinarayan | ... | B23K 20/1255 228/114.5 |
| 2009/0291322 A1* | 11/2009 | Watanabe | .......... | B23K 20/1265 428/653 |
| 2010/0089976 A1* | 4/2010 | Szymanski | .......... | B23K 20/122 228/113 |
| 2010/0089977 A1* | 4/2010 | Chen | .................... | B23K 20/122 228/114.5 |
| 2012/0202089 A1* | 8/2012 | Hangai | ................... | B32B 15/01 428/613 |
| 2015/0115019 A1* | 4/2015 | Pascal | ................. | B23K 20/125 228/112.1 |
| 2015/0175207 A1* | 6/2015 | Hata | .................... | B23K 20/122 280/785 |
| 2015/0183053 A1* | 7/2015 | Kumagai | ............. | B23K 20/126 228/112.1 |
| 2017/0341176 A1* | 11/2017 | Okada | .................. | B23K 20/123 |
| 2018/0050420 A1* | 2/2018 | Verma | ................ | B23K 20/2336 |
| 2018/0207745 A1* | 7/2018 | Hori | ..................... | B23K 20/125 |
| 2019/0077089 A1* | 3/2019 | Nishiguchi | .......... | B23K 20/122 |

FOREIGN PATENT DOCUMENTS

| | | | | |
|---|---|---|---|---|
| EP | 2 322 310 A1 | | 5/2011 | |
| JP | 10071479 A | * | 3/1998 | ........ B23K 20/1265 |
| JP | 11-47859 A | | 2/1999 | |
| JP | 2000-237882 A | | 9/2000 | |
| JP | 2001321967 A | * | 11/2001 | |
| JP | 2002-346770 | | 12/2002 | |
| JP | 2005199334 A | * | 7/2005 | |
| JP | 2005-255056 | | 9/2005 | |
| JP | 2006212651 A | * | 8/2006 | |
| JP | 2007098439 A | * | 4/2007 | |
| JP | 2009-154209 | | 7/2009 | |
| JP | 4846329 B2 | * | 12/2011 | |
| JP | 2015-30007 A | | 2/2015 | |
| JP | 2016-68130 | | 5/2016 | |
| JP | 2016153132 A | * | 8/2016 | |
| JP | 2016153133 A | * | 8/2016 | |
| JP | 2016153134 A | * | 8/2016 | |
| JP | 6344261 B2 | * | 6/2018 | |
| KR | 101429854 B1 | * | 8/2014 | |
| WO | WO-2004043642 A1 | * | 5/2004 | ........... B23K 20/122 |

OTHER PUBLICATIONS

Machine translation of JP-2005199334A (no date available).*
Garima Sharma, et al., "Superplastic deformation studies in Fe—28Al—3Cr intermetallic alloy", Materials Science and Engineering A, vol. 419, 2006, pp. 144-147.

* cited by examiner

US 10,549,379 B2

FRICTION STIR WELDING METHOD AND JOINED BODY

CROSS-REFERENCE TO RELATED APPLICATIONS

This application is based upon and claims the benefit of priority from Japanese Patent Application No. 2016-020744, filed on Feb. 5, 2016; the entire contents of which are incorporated herein by reference.

FIELD

Embodiments of the invention relate to a friction stir welding method and a joined body.

BACKGROUND

Friction stir welding is one method for joining multiple members. In friction stir welding, a tool that has a protrusion at its tip is pressed onto the members while rotating; and the protrusion is inserted into the members. At the joining portion periphery where the protrusion is inserted, the main materials are softened by frictional heat; and plastic flow of the joining portion periphery is caused by the rotation of the tool. Thereby, the multiple members are formed as one body at the joining portion periphery.

A long fatigue life of the joining portion periphery is desirable for the members after the joining.

DETAILED DESCRIPTION

Figure 1:
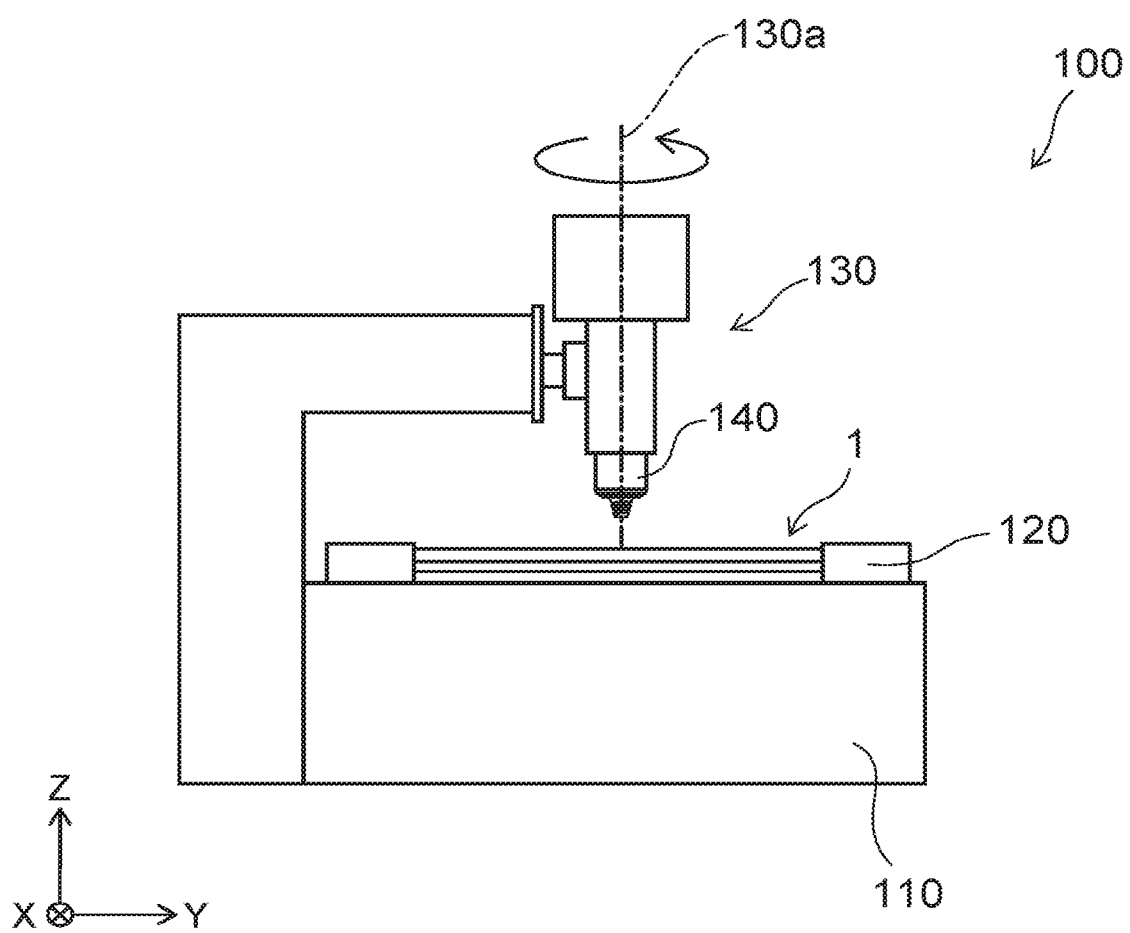
FIG. 1 is a schematic view illustrating a friction stir welding apparatus 100 used in a friction stir welding method according to the embodiment.

According to one embodiment, a friction stir welding method includes joining a first metal member, a second metal member, and a third metal member by pressing a tool onto a joining member while rotating the tool. The tool has a protrusion at a tip of the tool. The joining member includes the first metal member, the second metal member, and the third metal member. A major element of the second metal member is the same as a major element included in the first metal member. The third metal member is sandwiched between at least a portion of the first metal member and at least a portion of the second metal member. A major element of the third metal member is the same as the major element included in the first metal member and the second metal member. A crystal grain size of the third metal member is 20 µm or less.

Embodiments will now be illustrated with reference to the drawings. Similar components in the drawings are marked with the same reference numerals; and a detailed description is omitted as appropriate.

FIG. 1 is a schematic view illustrating a friction stir welding apparatus 100 used in a friction stir welding method according to the embodiment.

Figure 2:
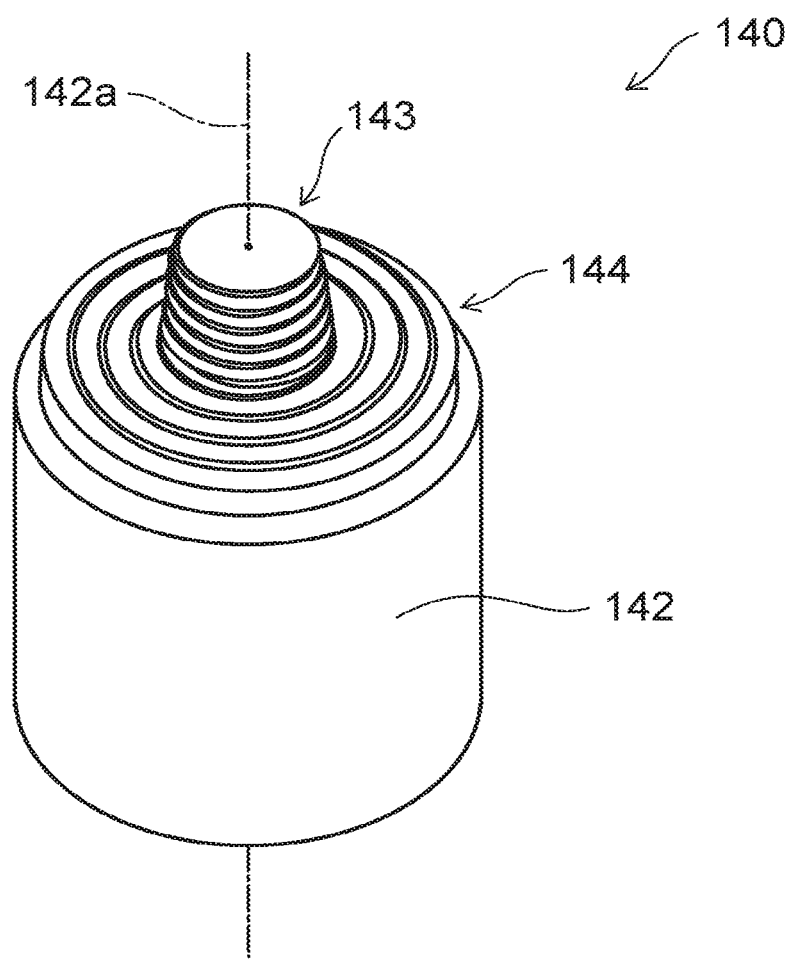
FIG. 2 is a schematic view illustrating a tool used in the friction stir welding method according to the embodiment.

FIG. 2 is a schematic view illustrating a tool 140 used in the friction stir welding method according to the embodiment.

As illustrated in FIG. 1, the friction stir welding apparatus 100 includes a placement unit 110, a holder 120, and a welder 130.

A joining member 1 is placed on the placement unit 110. Multiple metal members are overlaid in the joining member 1.

The holder 120 holds the joining member 1 placed on the placement unit 110.

The welder 130 includes a tool 140 (a joining tool) at the tip of the welder 130. The welder 130 rotates the tool 140 using a central axis 130a as the center.

The friction stir welding apparatus 100 performs friction stir welding by pressing, onto the joining member 1 held by the holder 120, the tool 140 rotated by the welder 130.

As illustrated in FIG. 2, the tool 140 includes a base 142, a protrusion 143, and a shoulder 144. In the example illustrated in FIG. 2, the base 142, the protrusion 143, and the shoulder 144 are formed as one body.

For example, the base 142 has a columnar configuration.

The protrusion 143 is provided at one end portion of the base 142. For example, the protrusion 143 has a truncated circular conical configuration; and a groove having a spiral configuration is formed in the side surface of the protrusion 143.

The shoulder 144 is the end portion of the base 142 on the side where the protrusion 143 is provided; and the shoulder 144 is provided around the protrusion 143. A concave taper is formed in the surface of the shoulder 144.

The protrusion 143 and the shoulder 144 are provided so that the centers of the protrusion 143 and the shoulder 144 match a central axis 142a of the base 142.

The detailed structures, etc., of the friction stir welding apparatus 100 and the tool 140 illustrated in FIG. 1 and FIG. 2 are not limited to the forms illustrated in FIG. 1 and FIG. 2 and may be modified appropriately according to the configuration, the characteristics, etc., of the joining member 1.

Figure 3:
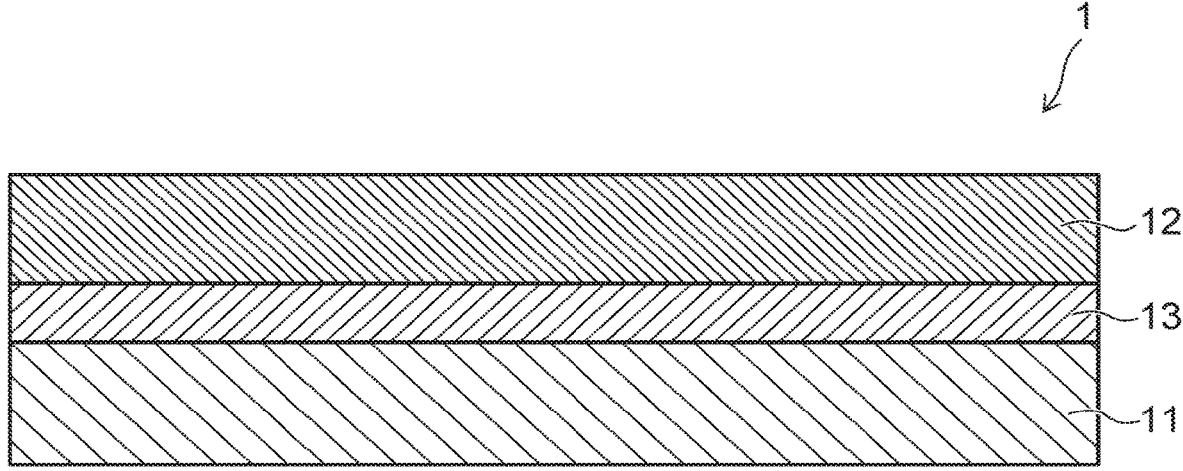
FIG. 3 is a schematic view illustrating a joining member joined by the friction stir welding according to the embodiment.

FIG. 3 is a schematic view illustrating a joining member 1 joined by the friction stir welding according to the embodiment.

As illustrated in FIG. 3, the joining member 1 includes a first metal member 11, a second metal member 12, and a third metal member 13.

The first metal member 11 and the second metal member 12 are the major members to be joined to each other.

The third metal member 13 is a member sandwiched between the first metal member 11 and the second metal member 12.

When the tool 140 is pressed onto the joining member 1, the first metal member 11 and the second metal member 12 are heated by frictional heat. The third metal member 13 is a member that has superplasticity at this time.

More specifically, the third metal member 13 includes fine crystal grains and has longer elongation than the first metal member 11 and the second metal member 12 when stress is applied in the state of being heated to a prescribed temperature.

The first metal member 11, the second metal member 12, and the third metal member 13 include, for example, the same major element. As an example, the first metal member 11, the second metal member 12, and the third metal member 13 include aluminum as the major element. More specifically, the first metal member 11 and the second metal member 12 include aluminum or an aluminum alloy; and the third metal member 13 includes fine crystal grains of aluminum.

Also, magnesium, titanium, copper, steel, zinc, lead, an alloy of these elements, etc., may be used as the material (the major element) of the first metal member 11, the third metal member 13, and the second metal member 12.

The crystal grain size included in the third metal member 13 will now be described.

For example, in the case where the third metal member includes aluminum, the third metal member 13 has superplasticity in the friction stir welding if the crystal grain included in the third metal member 13 is 20 μm or less.

In the case where the third metal member 13 includes another material, the third metal member 13 has superplasticity in the friction stir welding if the crystal grain size is as follows.

In the case where the third metal member 13 includes a copper alloy, the crystal grain size is 15 μm or less.

In the case where the third metal member 13 includes a zinc alloy, the crystal grain size is 10 μm or less.

In the case where the third metal member 13 includes a titanium alloy, the crystal grain size is 2 μm or less.

In the case where the third metal member 13 includes an iron or steel material, the crystal grain size is 2 μm or less.

It is not always necessary for all of the crystal grains included in the third metal member 13 to satisfy the conditions described above. Crystal grains that are larger than the grain sizes described above may be included in the third metal member 13 as long as the range is within a range in which the third metal member 13 has superplasticity in the friction stir welding.

The friction stir welding method according to the embodiment will now be described.

The joining member 1 is placed on the placement unit 110 of the friction stir welding apparatus 100 illustrated in FIG. 1 and held by the holder 120. The relative positions of the joining member 1 and the tool 140 of the welder 130 are matched. The rotating tool 140 is pressed onto the joining member 1; and the protrusion 143 is inserted into the joining member 1. The temperature of the joining member 1 increases due to the friction between the joining member 1 and the rotating tool 140; and the first metal member 11 and the second metal member 12 soften. The first metal member 11 and the third metal member 13 that are softened are joined; and the second metal member 12 and the third metal member 13 are joined. In other words, the first metal member 11 and the second metal member 12 are joined via the third metal member 13.

By the processes recited above, the joining member 1 is obtained in which the first metal member 11, the second metal member 12, and the third metal member 13 are joined.

Examples of the conditions of the friction stir welding method are as follows.

For the tool 140, the diameter of the base 142 is 5 mm. The diameter of the protrusion 143 is 2 mm. The height of the protrusion 143 is 1.5 mm. Here, the diameter means the dimension in a direction perpendicular to the central axis 142a of the base 142. The height means the dimension in a direction along the central axis 142a.

The thickness of the first metal member 11 is 1.0 mm. The thickness of the second metal member 12 is 1.0 mm. The thickness of the third metal member 13 is 0.3 mm.

In the friction stir welding, the rotation speed of the tool 140 is set to 1000 to 3000 rpm; and the insertion speed of the tool 140 with respect to the second metal member 12 is set to 0.1 to 1.0 mm/min. The protrusion 143 is inserted 1.3 to 1.9 mm into the second metal member 12; and the protrusion 143 is pulled out after maintaining in this state for 0.5 to 3.0 seconds.

In the processes described above, when the first metal member 11 and the second metal member 12 are pressed and softened, the third metal member 13 has superplasticity and elongates between the first metal member 11 and the second metal member 12.

This aspect will now be described using FIG. 4.

Figure 4:
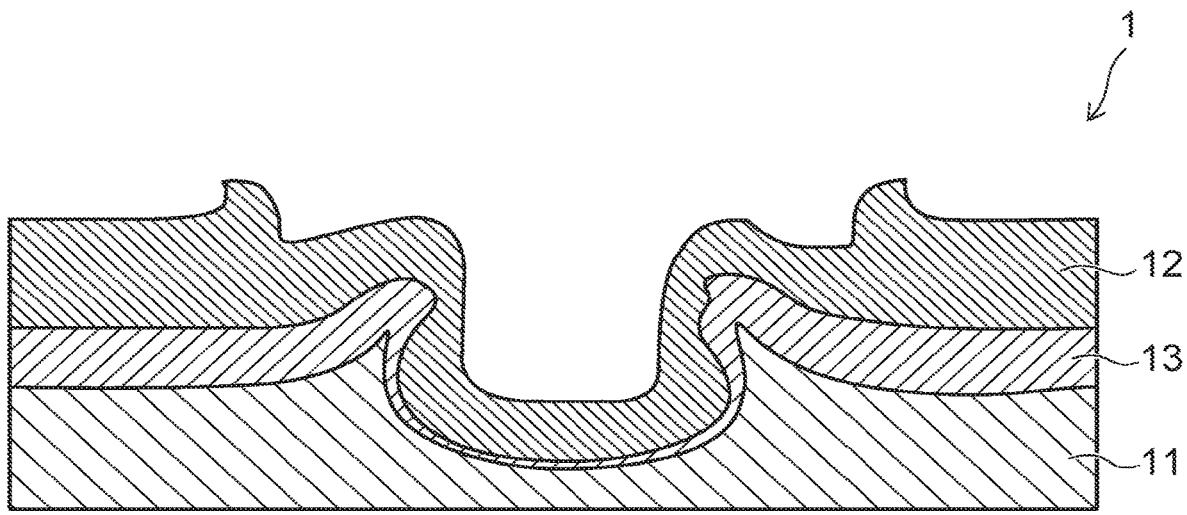
FIG. 4 is a schematic view illustrating the joining member joined by the friction stir welding method according to the embodiment.

FIG. 4 is a schematic view illustrating the joining member 1 joined by the friction stir welding method according to the embodiment.

FIG. 4 illustrates the state in the case where the friction stir welding is performed by pressing the tool 140 toward the first metal member 11 from the second metal member 12 side.

As illustrated in FIG. 4, the second metal member 12 is greatly curved downward by being pressed by the tool 140. Also, a depression is formed in the first metal member 11; and a portion of the second metal member 12 enters the interior of the depression. The third metal member 13 elongates between the first metal member 11 and the second metal member 12 according to the deformation of the first metal member 11 and the second metal member 12. In particular, the elongation amount of the third metal member 13 is large at the portion of the first metal member 11 entering the depression of the second metal member 12. Therefore, the film thickness of the third metal member 13 at this portion is thinner than the film thickness at the other portions.

Effects according to the embodiment will now be described with reference to FIG. 4 and FIGS. 5A and 5B.

Figure 5A:
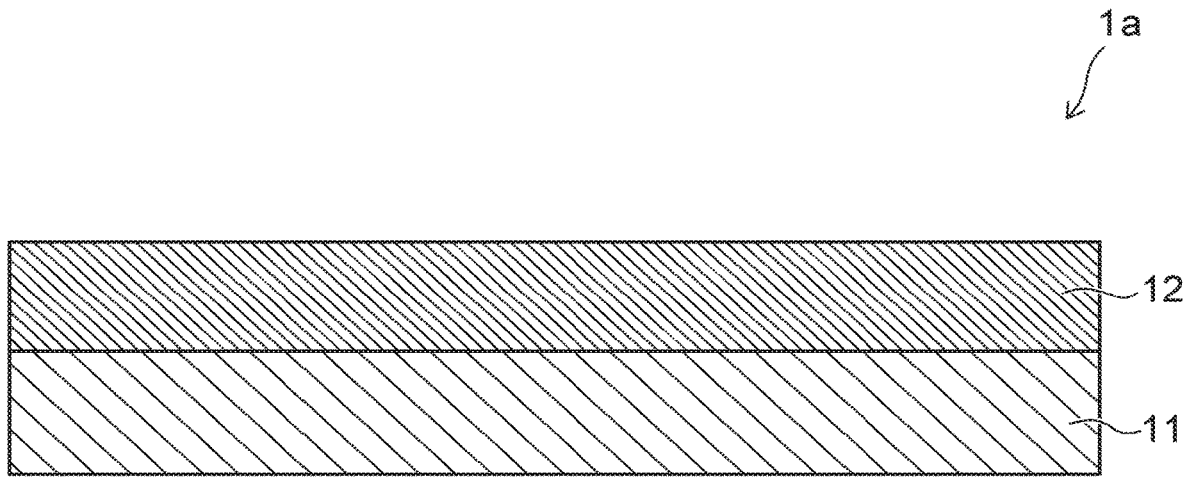
FIGS. 5A and 5B are schematic views illustrating a friction stir welding method according to a comparative example.
Figure 5B:
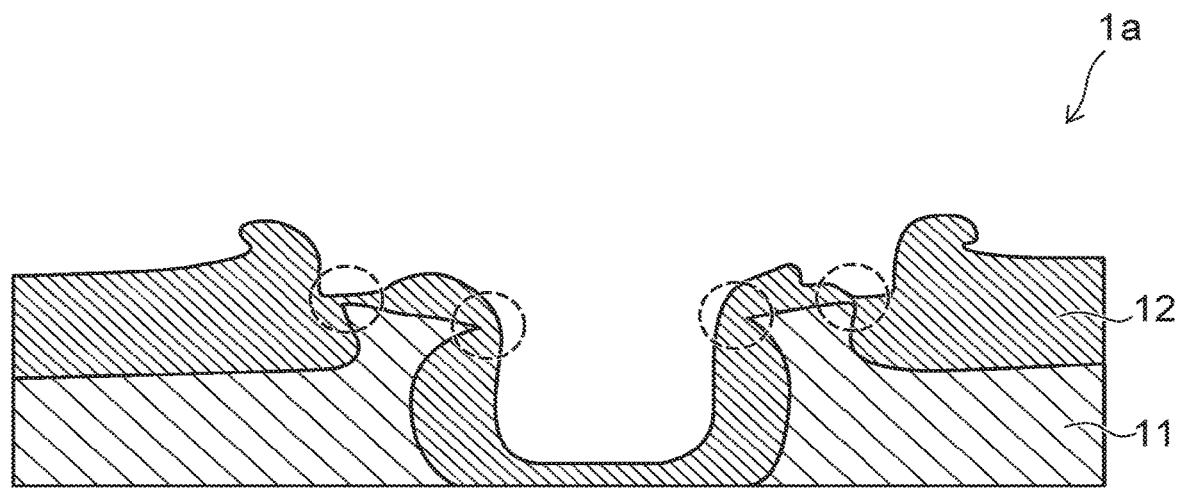

FIGS. 5A and 5B are schematic views illustrating a friction stir welding method according to a comparative example.

Specifically, FIG. 5A illustrates a joining member 1a before the friction stir welding. FIG. 5B illustrates the joining member 1a joined by the friction stir welding method according to the comparative example.

As illustrated in FIG. 5A, the joining member 1a includes only the first metal member 11 and the second metal member 12 and does not include the third metal member 13. In the case where the friction stir welding is performed by pressing the joining member 1a toward the first metal member 11 from the second metal member 12 side, a portion of the first metal member 11 undergoes plastic flow and flows into the second metal member 12. At this time, the portion of the first metal member 11 undergoing plastic flow flows excessively into the second metal member 12. Thereby, as in the portions surrounded with broken lines in FIG. 5B, the thickness of the second metal member 12 becomes thin locally. As a result, the fatigue life of the joining member 1a is undesirably short.

Conversely, in the friction stir welding method according to the embodiment, the third metal member 13 that has superplasticity in the friction stirring is disposed between the metal plates to be joined. By performing the friction stir welding of the first metal member 11 and the second metal member 12 with the third metal member 13 disposed between the first metal member 11 and the second metal member 12, the flow of the first metal member 11 toward the second metal member 12 when the first metal member 11 undergoes plastic flow is suppressed by the third metal member 13 as illustrated in FIG. 4. Because the third metal member 13 has superplasticity, the plastic flow of the first metal member 11 can be suppressed without the third metal member 13 fracturing between the first metal member 11 and the second metal member 12. Accordingly, the portion where the film thickness is thin as illustrated in FIG. 5B does not form easily in the second metal member 12 after the joining.

In other words, according to the friction stir welding method according to the embodiment, it is possible to extend the fatigue life of the joining member 1 after the joining.

The problems described above may be more pronounced in the case where the flow stress of the first metal member 11 at 300° C. or more is higher than the flow stress of the second metal member 12 at 300° C. or more. This is because the first metal member 11 is expelled more easily if the flow stress of the second metal member 12 at 300° C. or more is higher than that of the first metal member 11 when the second metal member 12 undergoes plastic flow toward the first metal member 11; and the thickness of the first metal member 11 easily becomes thinner locally.

Accordingly, the friction stir welding method according to the embodiment is more effective in the case where the flow stress of the first metal member 11 at 300° C. or more is higher than the flow stress of the second metal member 12 at 300° C. or more.

The flow stress is an indicator of the fluidic property when the friction stirring is performed. The fluidic property increases as the flow stress decreases. In the friction stirring, for example, the flow stress can be determined from the change of the load applied to the tool 140 when the temperature of the joining member 1 changes. For example, the flow stress of various aluminum alloys are described in FIG. 6 and the accompanying description in "Problems for Application Situation of Development in Friction Welding," Hisanori Okamura et al., Journal of the Japan Welding Society, Vol. 72, 2003, 134-142.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A friction stir welding method, comprising:
   preparing a first metal member, a second metal member, and a third metal member, a major element of the second metal member being the same as a major element included in the first metal member, a major element of the third metal member being the same as the major element included in the first metal member and the second metal member, a crystal grain size of the third metal member being 20 μm or less;
   providing a joining member by sandwiching the third metal member between at least a portion of the first metal member and at least a portion of the second metal member in a first direction;
   rotating a tool comprising a protrusion integrally provided at a tip of the tool; and
   downwardly curving the second metal member and forming a depression in the first metal member by pressing the tool onto the joining member, holding the tool in the joining member while rotating the tool and pulling out the tool from the joining member, wherein
   after the pulling out, the joining member includes a first boundary surface between the first metal member and the third metal member and a second boundary surface between the second metal member and the third metal member at a portion of the depression, and
   the first boundary surface and the second boundary surface are arranged with part of the first metal member in a second direction crossing the first direction.

2. The method according to claim 1, wherein the major element of the first metal member, the major element of the second metal member, and the major element of the third metal member are aluminum, magnesium, titanium, copper, steel, zinc, lead, or an alloy of these elements.

3. The method according to claim 1, wherein a flow stress of the first metal member at 300° C. or more is higher than a flow stress of the second metal member at 300° C. or more.

4. A friction stir welding method, comprising:
   preparing a first metal member, a second metal member, and a third metal member, the third metal member having superplasticity;
   providing a joining member by sandwiching the third metal member between at least a portion of the first metal member and at least a portion of the second metal member in a first direction; and
   downwardly curving the second metal member and forming a depression in the first metal member by pressing a tool onto the joining member, holding the tool in the joining member while rotating the tool and pulling out the tool from the joining member, the tool having a protrusion at a tip of the tool, wherein,
   after the pulling out, the joining member includes a first boundary surface between the first metal member and the third metal member and a second boundary surface between the second metal member and the third metal member at a portion of the depression, and
   the first boundary surface and the second boundary surface are arranged with part of the first metal member in a second direction crossing the first direction.

5. The method according to claim 4, wherein the first metal member, the second metal member, and the third metal member include the same major element.

6. The method according to claim 4, wherein the major element of the first metal member, the major element of the second metal member, and the major element of the third metal member are aluminum, magnesium, titanium, copper, steel, zinc, lead, or an alloy of these elements.

7. The method according to claim 4, wherein a flow stress of the first metal member at 300° C. or more is higher than a flow stress of the second metal member at 300° C. or more.

8. The method according to claim 1, wherein
   after the pulling out, the joining member includes a third boundary surface between the first metal member and the third metal member and a fourth boundary surface between the second metal member and the third metal member at another portion other than the depression and
   the third boundary surface and the fourth boundary surface are arranged with part of the second metal member downwardly curved in the second direction.

9. The method according to claim 8, wherein a distance in the first direction between the first boundary surface and the second boundary surface is shorter than a distance in the first direction between the third boundary surface and the fourth boundary surface.

10. The method according to claim 8, wherein a position of the second boundary surface in the first direction is between a position of the first boundary surface in the first direction and a position of the third boundary surface in the first direction.

11. The method according to claim 4, wherein
after the pulling out, the joining member includes a third boundary surface between the first metal member and the third metal member and a fourth boundary surface between the second metal member and the third metal member at another portion other than the depression and the third boundary surface and the fourth boundary surface are arranged with part of the second metal member downwardly curved in the second direction.

12. The method according to claim 11, wherein a distance in the first direction between the first boundary surface and the second boundary surface is shorter than a distance in the first direction between the third boundary surface and the fourth boundary surface.

13. The method according to claim 11, wherein a position of the second boundary surface in the first direction is between a position of the first boundary surface in the first direction and a position of the third boundary surface in the first direction.

* * * * *